Figure 14:
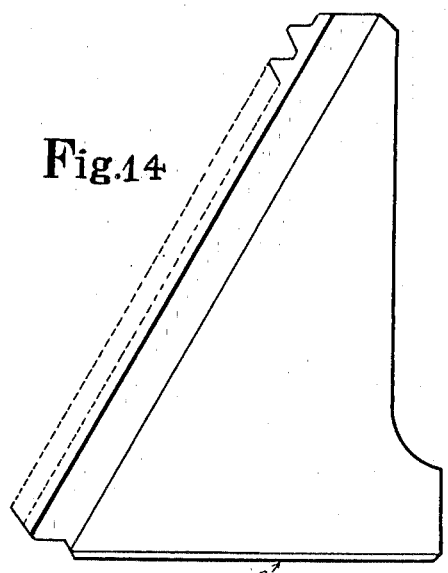

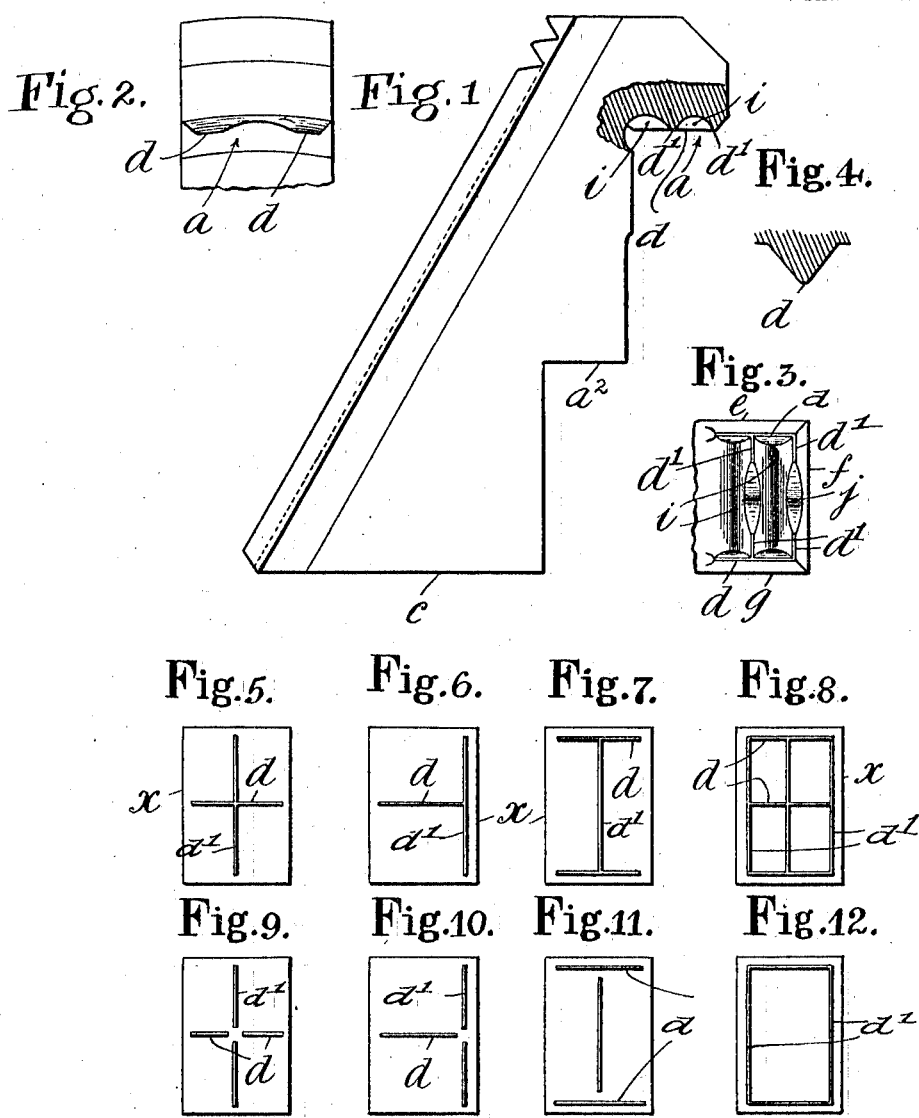

G. B. TAYLOR.
GRIPPING SURFACE OF CHUCK JAWS.
APPLICATION FILED JAN. 26, 1912.

1,059,234.

Patented Apr. 15, 1913.
3 SHEETS—SHEET 2.

Witnesses:

Inventor
George B. Taylor
by James L. Norris
Atty.

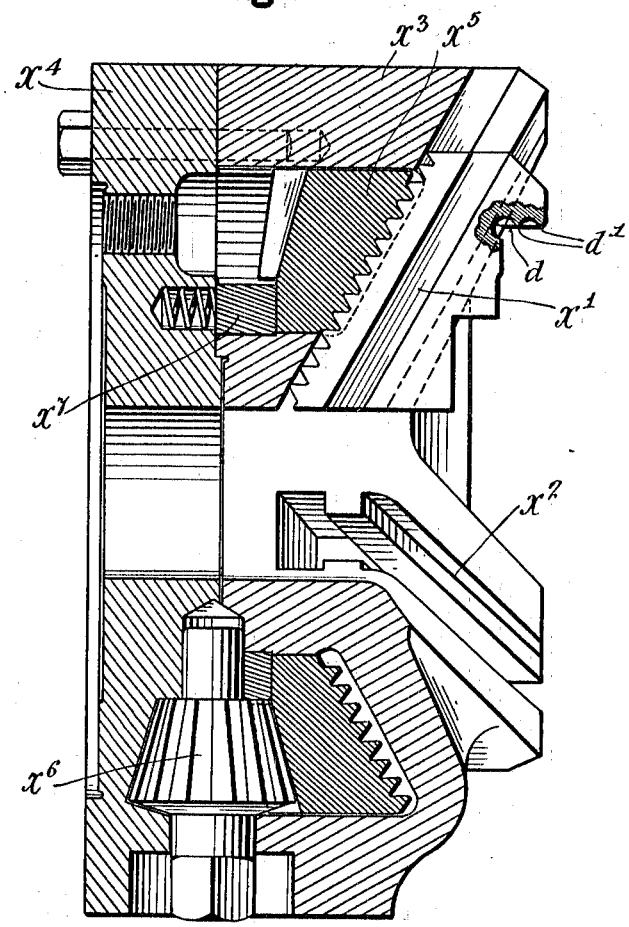

UNITED STATES PATENT OFFICE.

GEORGE BENJAMIN TAYLOR, OF BIRMINGHAM, ENGLAND.

GRIPPING-SURFACE OF CHUCK-JAWS.

1,059,234. Specification of Letters Patent. Patented Apr. 15, 1913.

Application filed January 26, 1912. Serial No. 673,499.

*To all whom it may concern:*

Be it known that I, GEORGE BENJAMIN TAYLOR, subject of the King of Great Britain, residing at Bartholomew street, Birmingham, in the county of Warwick, England, have invented certain new and useful Improvements in Gripping-Surfaces of Chuck-Jaws, of which the following is a specification.

The invention relates to the gripping surfaces of chuck jaws and is comprised in the hereinafter described improvements therein whereby the grip both axially of the chuck and torsionally in respect of the work or article held is rendered much more efficient than hitherto.

It has previously been proposed to form the gripping surface of a chuck jaw with definite teeth arranged at an angle between the two directions in which the work tends to slip and of a cross sectional shape approximating to a V as, for instance, according to British Letters Patent No. 25830 of 1909; and also to provide similar teeth by cutting spaced grooves parallel with the axis of the chuck, the consequent teeth being themselves sometimes crossed with groovings which break them up. This last described arrangement of teeth is usually carried out throughout the entire gripping surface by grooving said surface so as to provide many teeth with the grooves of about the breadth of the teeth, but said arrangement has been modified to provide only one or two definite teeth on the gripping surface always directed toward, or facing, and arranged parallel with the axis of the chuck and usually cross grooved to break the line or lines of teeth up.

The present invention relates to a definite tooth formation of the kind referred to but provides an improved formation of gripping surface combining with the ordinary axially directed teeth, which are provided to resist torsional slip of the work, similar teeth arranged at right angles, or approximately at right angles, to the axially directed teeth, the additional teeth extending entirely or almost entirely across the grooves or spaces between the axially directed teeth formed consequent upon their formation, such similar teeth being provided for the purpose of resisting end motion, thrust, or pull of the work and being the primary distinguishing feature of the invention for the reason that the spaces or grooves between, or at the sides of, the axially directed teeth are crossed by the similar teeth. It is advantageous and according to the invention to arrange so that the axially directed teeth and those at right angles, or approximately at right angles thereto, join up or run the one into the other to thereby mutually support and strengthen each other, and the preferable arrangement in carrying the invention into effect is to provide only a few teeth in each of the two directions with comparatively large internal spacings or hollows separating them, and to arrange so that the tooth edge in each direction particularly the teeth which are directed toward, or face, the axis of the chuck is as unbroken as possible, that is to say it is desirable to have no cross grooving on any of the lines of teeth, as thereby the teeth are stronger and there is a larger unbroken length of tooth edge in contact with the work. Few teeth and large spacings are more or less desirable in carrying the invention into effect to give the teeth a better chance to penetrate the work, or to cause a more decided surface distortion in relation to the power provided to force the jaws into grip, and also to give the whole length of tooth edge a better chance of coming into action to grip.

The distinguishing features of the invention are capable of being carried out by various modifications some of which are set out on the accompanying sheets of drawings and are hereinafter more particularly described.

Figure 16:
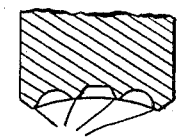
Figure 15:
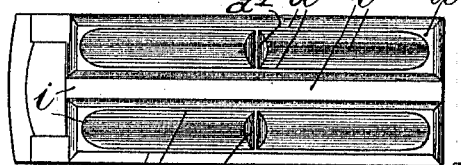
Figures 17, 18:
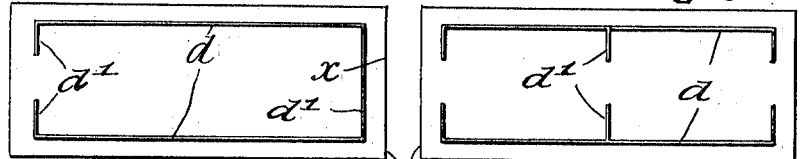
Figures 19, 20:
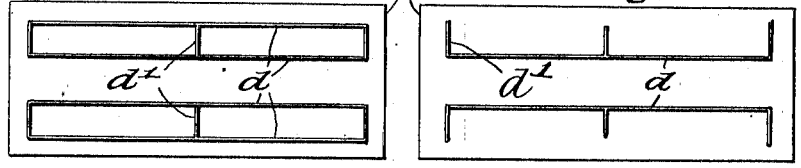
Figure 21:
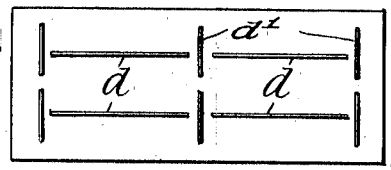

In said drawings, Figure 1 is a side elevation of a stepped chuck jaw whose gripping surfaces are constructed according to this invention; Fig. 2 is a fragmental front elevation of the upper portion of Fig. 1; Fig. 3 is an inverted fragmental plan view of Fig. 2; Fig. 4 is an enlarged transverse sectional view of one of the main or axially-directed teeth; Figs. 5 to 13 are diagrammatic plan views showing modified arrangements of teeth; Fig. 14 is a side elevation of a chuck jaw suitable for rod work; Fig. 15 is an inverted plan view of the gripping surface of the jaw shown in Fig. 14; Fig. 16 is a transverse sectional view of Fig. 15; Figs. 17 to 21 are diagrammatic plan views showing modified arrangements of teeth for a chuck jaw of the type shown in Fig. 14. Fig. 22 is a transverse sectional view of the complete chuck.

Referring to said drawings, and more particularly to Fig. 22 thereof, there is shown a multi-jawed chuck, of which $x^3$ indicates the body and $x^4$ the back plate. The first-mentioned part is formed with a guide way $x^2$ for each jaw $x^1$, the said jaws, (of which, however, only one is represented), being operated by means of an annular rack $x^5$ which is toothed upon both surfaces. Said rack is driven by a suitable pinion $x^6$, that meshes with the teeth on the rear surface thereof, the teeth on its front surface meshing in turn, with those on the rear faces of the jaws. In Fig. 1, one of the chuck jaws $x^1$ is shown in detail, said jaw being formed with three steps whose gripping surfaces are indicated by the letters $a$, $a^2$ and $c$. The teeth $d$ on the surface $a$, (bearing in mind the arrangement of parts depicted in Fig. 22), will thus be understood to face or be directed toward the axis of the chuck, and, also, to be disposed, so to speak, approximately parallel with said axis. One of these teeth is illustrated on an enlarged scale in Fig. 4, from which it will be seen that said tooth is slightly flattened on its biting edge and strong at its base. This feature may pertain to all the forms represented in the modifications hereinafter described, although by itself no separate claim is made thereto as any other suitable sectional shape may be used. The length and breadth of the gripping surface $a$ cut or formed with teeth is represented by the lines $e$, $f$ and $g$, the axially directed teeth by the letter $d$ and the large spacings or hollows at $i$ and it will be seen that the teeth are few relative to the area of the gripping surface, the spacings or hollows large, and the length of biting edge considerable comparative with the number of teeth. It will also be seen that in addition to the teeth $d$, which, as stated, are directed toward and are substantially parallel with the axis of the chuck, separate and distinct teeth $d'$ are also produced, which are disposed at right angles to the axially-directed teeth to resist the slip of the work in both directions. Additional hollows $j$ are provided at two of the biting edges in view of different diameters of work being held by the same gripping surface: For instance the gripping surface in the construction shown in Figs. 2 and 3 is formed so that it is most effective upon a given diameter of work, but by providing the hollows $j$ work of smaller diameter is well cleared opposite said hollows, namely at the center of the surface, and is therefore gripped the nearer to the tooth edges which are parallel with the axis of the chuck.

Figs. 5 to 13 show diagrammatic plans similar to Fig. 3 of the same arrangement giving different patterns all of which are within the scope of the invention for the reason that in addition to the definite teeth $d$ axial of the chuck there are the separate definite teeth $d'$ at right angles, or approximately at right angles to the axially directed teeth, and provided to resist end movement of the work or movement axially of the chuck and to cross the grooves or spaces formed by the formation of the axial teeth. In all these patterns the thick lines $d$ represent the axially-directed teeth, $d'$ the transversely-disposed teeth, and $x$ the outer boundary lines of the gripping surface.

The chuck jaw shown in Fig. 14 is similar to that shown in Fig. 1 but has the gripping surface at the bore only as at $c$, this jaw being suitable for rod work and such like. In this arrangement of the invention the gripping surface is of much larger area but there are still the definite and independent teeth arranged to resist in both directions the tendency of the work to slip and to cross each others' grooves or spaces. The hollows or spacings at $i$, with still the similar cross section of tooth to what is represented in Fig. 4. In this arrangement the corners $d^3$ of the biting edges are thickened up or flattened slightly to prevent the further penetration of the work at these parts after the work has been once fixed in the chuck, and which further penetration if such corners were less flattened, would be due to the wabbling tendency of the work while held between the gripping surfaces due to the machining action upon the work.

Figs. 17 to 21 show diagrammatic representations of further modified arrangements of the lines of teeth, $d$ indicating the axially-directed teeth, $d'$, the transversely-disposed teeth and $x$ the boundary faces of the gripping surface of the jaw, the primary feature of the invention being in all the forms still present for the reason that there are definite and distinct teeth arranged against the tendency of the work to slip in the two directions, namely in line with the axis of the chuck and torsionally, and crossing each others' grooves or spaces.

Having now described my invention what I claim and desire to secure by Letters Patent is:—

1. A chuck jaw having a gripping surface provided with teeth directed toward and substantially parallel with the axis of the chuck and arranged in spaced relation to each other, and with additional teeth arranged approximately at right angles to the first-named teeth and extending across the spaces between the same.

2. A chuck jaw having a gripping surface provided with teeth directed toward and substantially parallel with the axis of the chuck and which extend approximately from one end thereof to the other and are arranged in spaced relation to each other, and with additonal transversely-disposed teeth which extend approximately from one side edge of said surface to the other and across the spaces between the first-named teeth.

3. A chuck jaw having a gripping surface provided with teeth directed toward and substantially parallel with the axis of the chuck and arranged in spaced relation to each other, and with additional teeth arranged approximately at right angles to the first-named teeth and extending across the spaces between the same, said first- and second-named teeth joining each other.

4. A chuck jaw having a gripping surface provided with a tooth which is directed toward and substantially parallel with the axis of the chuck and has a space at each side thereof, resulting from its formation, and with a plurality of teeth which are disposed approximately at right angles to the first-named teeth and extend across said spaces.

5. A chuck jaw having a gripping surface provided with a tooth which is directed toward and substantially parallel with the axis of the chuck and has a space at one side thereof, resulting from its formation, and with a tooth which is disposed approximately at right angles to the first-named tooth and extends across said space.

In testimony whereof I have hereunto set my hand in presence of two subscribing witnesses.

GEORGE BENJAMIN TAYLOR.

Witnesses:
 GEO. FUERY,
 BERNARD H. TINGLE.

---

Copies of this patent may be obtained for five cents each, by addressing the "Commissioner of Patents, Washington, D. C."